(No Model.)
P. McMACKIN.
UNDERGROUND CONDUCTOR.
No. 327,458. Patented Sept. 29, 1885.
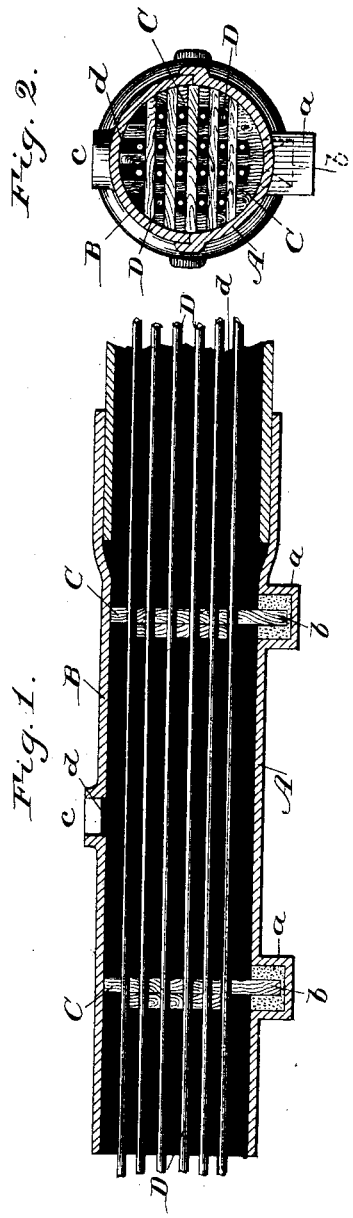
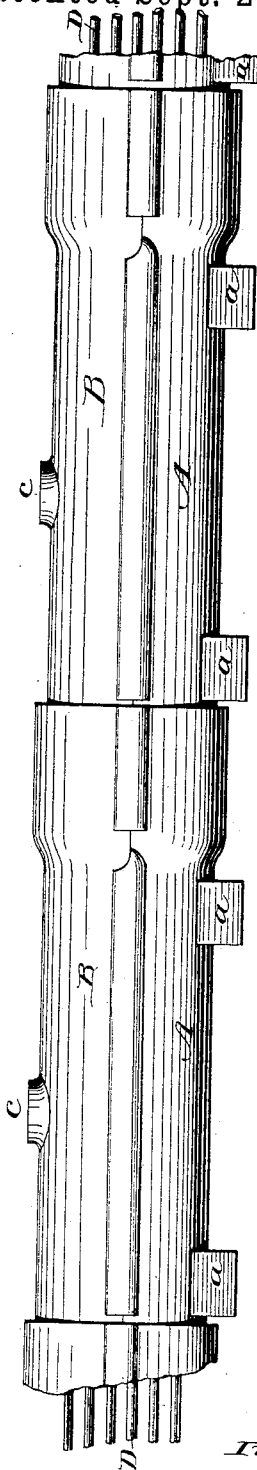
Witnesses:
Inventor:
Peter McMackin
by Marcellus Bailey
his attorney

UNITED STATES PATENT OFFICE.

PETER McMACKIN, OF LONSDALE, RHODE ISLAND.

UNDERGROUND CONDUCTOR.

SPECIFICATION forming part of Letters Patent No. 327,458, dated September 29, 1885.

Application filed May 31, 1884. Renewed May 21, 1885. (No model.)

*To all whom it may concern:*

Be it known that I, PETER MCMACKIN, a citizen of the United States, and a resident of Lonsdale, in the county of Providence and State of Rhode Island, have invented certain new and useful Improvements in Laying the Electrical Conductors of Underground Conductors, of which the following is a specification, reference being had to the drawings accompanying and forming a part of the same.

The invention is directed to means for sheathing and protecting electrical conductors in subterranean lines. For this purpose I employ a sectional sewer-pipe, similar to that for which Letters Patent No. 215,947 were granted to me on the 27th day of May, 1879. I combine with a pipe of that general description non-conducting holders for the electrical conducting-wires, in which the wires are held in position without contact with one another. These holders are placed in the lower section of the pipe, and after the wires are in position therein the upper section is set in place, thus completing the pipe-section. Through an opening in the upper section a non-conducting composition is then poured in, filling the pipe and surrounding the wires, which are thus held in place and insulated from one another.

The nature of my invention and the manner in which the same is or may be carried into effect will be understood by reference to the accompanying drawings, in which—

Figure 1 is a vertical central longitudinal section of the conduit or inclosing pipe, showing the arrangement of conductors therein. Fig. 2 is a transverse section of the pipe, and Fig. 3 is a side elevation of a portion of the conduit as completed.

A B are the two sections of the pipe, made in accordance with my Letters Patent hereinbefore referred to. They therefore, except in the particulars hereinafter noted, require no further description here.

The holders for the electrical conductors D consist of slotted disks or frames C, which are placed at suitable distances apart in the lower section, A, of the line of pipe. They are made of wood or other material which is a non-conductor of electricity, and are secured in place in the position indicated by any suitable means. I prefer, for this purpose, to cast the bottom pipe-sections with recesses $a$, into which tongues or lugs $b$ on the base of the wire-receiving disks project, and can then be cemented or otherwise secured in place. The slots in the disks are, as shown, parallel with one another, and are also open at their upper extremities, so that when the disks are placed in the lower pipe-section, as represented, the open ends of the slots will be exposed and in a position to receive the wires D. The conducting-wires, which extend along through the line of piping, enter the slots in the disks, those wires which lie in the same slot being insulated and separated from one another by small interposed blocks of some non-conducting material. The wires are of course laid before the upper sections, B, are put in place. When they are in position, the upper sections, B, are put in place and sealed or not, as preferred. Thus the wires are inclosed within a pipe and are held in position. Then through suitable openings, C, in the top sections a liquid composition of asphaltum or other non-conducting substance or substances is poured in, so as to fill the pipe, as shown at $d$. This composition surrounds the wires, and when it hardens holds them firmly and immovably in place in a state of entire insulation, both from one another and from surrounding objects.

While I prefer to use top and bottom pipe-sections made in accordance with my aforesaid patented invention, yet I may use top and bottom sections of other forms.

What I claim, and desire to secure by Letters Patent, is—

1. The combination, with a pipe composed of longitudinal sections fitted together and the upper sections provided with apertures, substantially as described, of electrical conductor-supports placed at intervals for receiving and holding said conductors in position, and a filling of insulating material.

2. The combination, with a pipe composed of two longitudinal sections adapted to be fitted together, substantially as described, of disks arranged at intervals in said pipe, and provided with a series of parallel slots open at their upper extremities for receiving the electrical conductors, cross-bars for holding the same in position, and an insulating-filling, as set forth.

3. The combination of the pipe-sections, the slotted wire-receiving disks or holders placed at intervals throughout the length of the pipe, the cross-bars placed at right angles to the slots for holding the wires in position, and an insulating compound which hardens when cold and fills the spaces in the pipe between the disks, as described.

In testimony whereof I have hereunto set my hand this 24th day of May, 1884.

PETER McMACKIN.

Witnesses:
DANIEL W. FINK,
HENRY C. SPALDING.